April 20, 1937.  C. C. FARMER  2,077,922
LOAD BRAKE MECHANISM
Filed Dec. 11, 1935
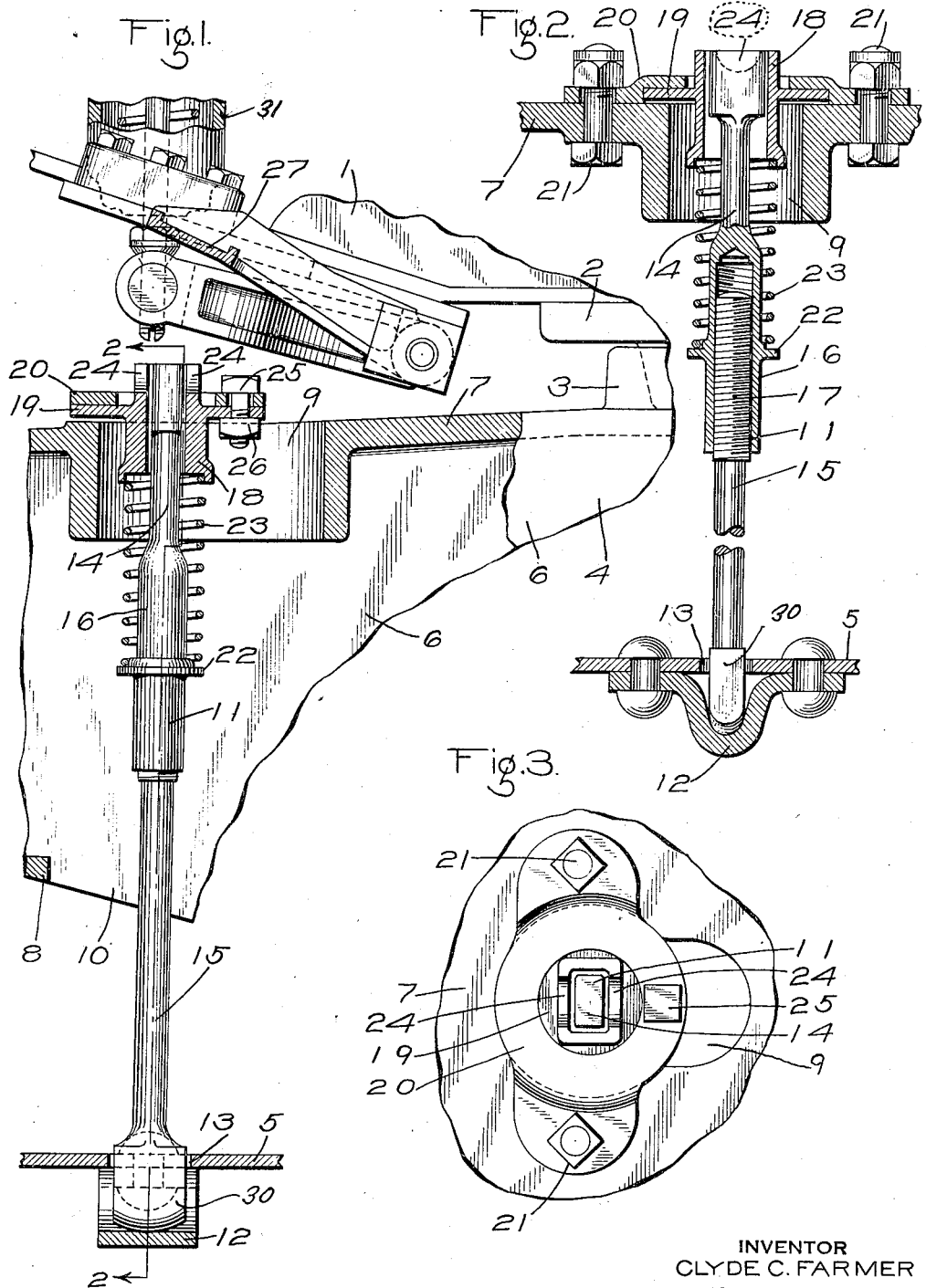
INVENTOR
CLYDE C. FARMER
BY *Wm. H. Cady*
ATTORNEY Patented Apr. 20, 1937

2,077,922

UNITED STATES PATENT OFFICE 2,077,922

LOAD BRAKE MECHANISM

Clyde C. Farmer, Pittsburgh, Pa., assignor to The Westinghouse Air Brake Company, Wilmerding, Pa., a corporation of Pennsylvania Application December 11, 1935, Serial No. 53,855

20 Claims. (Cl. 188—195)

This invention relates to load brake mechanism for vehicles and more particularly to that type of mechanism which is adapted to be automatically set or conditioned for either light or heavy load braking according to variations in the distance between the body of the vehicle and the vehicle truck due to variations in the weight of the lading carried by the vehicle.

The mechanism for conditioning the brake equipment for either empty or load braking is carried by the vehicle body and is movable vertically therewith and is adapted to be controlled according to the position which the body assumes relative to a fixed part of the vehicle truck under variations in the weight of the lading carried. The fixed part of the truck may be in the form of a vertically disposed strut which may be supported by the usual spring plank of the truck or by a supporting construction such as disclosed in my pending application, Serial No. 53,854, filed December 11, 1935 when the truck is constructed without a spring plank.

Due to unavoidable manufacturing inaccuracies in building railway vehicles and trucks and to unavoidable variations in the resisting power of the usual truck bolster supporting springs, the distance between the vehicle body and the spring plank and consequently between the vehicle body and the strut carried by the spring plank may be such that the proper control of the load mechanism cannot be obtained. This may also be the case when due to wear of the several moving parts of the car body and truck and to the weakening of the truck bolster springs the distance between the body and spring plank changes.

The principal object of the invention is to provide a load brake controlling strut mechanism which is adapted to be adjusted to provide the proper distance between the vehicle body and the strut to insure the proper control of the load mechanism carried by the body.

Another object of the invention is to provide a load brake controlling strut having novel means whereby the length of the strut may be readily and accurately varied.

These and other objects will appear in the following more detailed description of the invention.

In the accompanying drawing, Fig. 1 is a fragmentary view, partly in section, of a vehicle body and a supporting truck; Fig. 2 is a vertical sectional view taken on the line 2—2 of Fig. 1; and Fig. 3 is a fragmentary plan view of the truck bolster and the strut mechanism.

The vehicle body may be of any desired construction and as shown in the drawing may comprise a body bolster 1 having secured thereto a body center plate 2 which is pivotally mounted in a truck center plate 3 carried by a truck bolster 4.

The truck may be of any well known type comprising spaced side frames carrying springs which yieldably support the truck bolster 4 at its ends and may comprise a strut supporting member 5 which is carried by the side frames. The strut supporting member may be in the form of a spring plank which is adapted to tie the side frames together in a more or less rigid manner or may be in the form of a light strut support such as is disclosed in my aforementioned pending application when the spring plank is omitted from the truck.

As shown in Fig. 1 the truck bolster 4 may comprise spaced vertically disposed sides 6 which are connected together by top and bottom horizontally disposed webs or members 7 and 8 respectively.

The members 7 and 8 of the truck bolster are provided with registering openings 9 and 10, respectively, for the accommodation of a vertically disposed strut 11 which is supported at its lower end by a member 12 riveted or otherwise secured to the underside of the supporting member 5, the strut extending through an opening 13 in the member 5.

The strut 11 comprises vertically aligned upper and lower sections 14 and 15, respectively, the lower end portion of the upper section 14 being preferably made in the form of a sleeve 16 which has screw-threaded connection with the upper screw-threaded end 17 of the lower section 15.

The upper end portion of the upper section 14 of the strut is of rectangular form in cross-section and is slidably guided in a vertically disposed rectangular sleeve-like guide 18 having, intermediate its ends, a plain circular exterior collar 19 which is rotatably mounted on the top member 7 of the truck bolster and which is clamped in rotatable relation with the member 7 by means of a bearing plate 20 which is secured to the member by bolts 21 or any other desired means.

It will here be understood that the clearance space provided between the rectangular upper portion of the strut section 14 and the inner surface of the guide 18 is sufficient to permit free relative vertical movement between the strut and the guide but is not great enough to permit relative rotation between these parts.

The sleeve portion 16 of the upper section of the strut is provided with an exterior annular collar 22 and interposed between and engaging this collar and the lower end of the guide 18 is a spring 23 which, at all times, acts to maintain the lower end of the strut in non-chattering engagement with the member 12 and to also maintain the collar 19 in non-chattering engagement with the plate 20.

The opposite side walls of the upper portion of the guide 18 are each provided with a notch 24 through which the upper end of the strut may be viewed to ascertain whether or not the strut is of the proper length.

Normally the collar 19 and consequently the sleeve 16 is held against rotation by means of a headed bolt 25 which passes through registering openings in the collar 19 and the plate 20 rigidly secured to the truck bolster, the threaded end of the bolt being provided with a nut 26 to prevent loss of the bolt. When the collar is thus held in place the notched side walls of the upper portion of the guide 18 will be parallel with the longitudinal center line of the truck so that the upper end of the strut may be easily seen from one side of the vehicle.

The fluid pressure brake equipment and the empty and load change-over apparatus carried by the body of the vehicle may be the same as that fully shown, described and claimed in a joint application of Earle S. Cook and Ellis E. Hewitt, Serial No. 51,798, filed November 27, 1935. In view of this, a brief description of that portion of the strut cylinder mechanism of the change-over apparatus with which the strut 11 is adapted to cooperate is all that is deemed necessary in this specification.

The strut cylinder mechanism as shown in Fig. 1 may comprise a cylinder device 31 which is operable by fluid under pressure, supplied from the usual brake pipe (not shown) in initially charging the equipment, to move a controlling arm 27, pivotally carried by the vehicle body, into engagement with the upper end of the strut 11.

If the vehicle is empty the upper end surface of the strut 11 will be flush with the upper edge of the guide 18 and the arm 27 and consequently the cylinder device will be permitted to travel a sufficient distance for the piston device to supply fluid under pressure to cause the change-over apparatus to function to condition the brake equipment for light braking. As the vehicle is being loaded the truck bolster 4 will be caused to move downwardly relative to the side frames, member 5 and strut 11 and when the vehicle has been loaded to one-half or slightly more than one-half of its capacity the distance between the upper end of the strut 11 and the arm 27 will have been decreased to such an extent that, when the brake pipe is initially charged the strut cylinder mechanism will be brought to a stop, by the engagement of the arm 27 with the strut, short of its empty change-over position and as a consequence the change-over apparatus will be caused to function to condition the brake equipment for load braking.

It will be understood by those whose duty it is to maintain the brake apparatus in proper operating condition that when the vehicle is empty, the upper end surface of the strut 11 must be flush with the upper end surface of the guide 18 in order to insure the proper control of the empty and load brake equipment carried by the vehicle body.

If, with the car empty, the upper end surface of the strut is either above or below the upper end surface of the guide 18 it will be understood that the strut should be adjusted to its proper length. In order to accomplish this, the bolt 25 is first removed so as to permit the upper section 14 of the strut and the guide 18 to be rotated, then by the use of a wrench or other suitable tool which may be applied to the lower end of the sleeve 16, the upper section 14 of the strut is rotated relative to the lower section 15 of the strut until the upper end surface of the section 14 is flush with the upper edge surface of the guide 18. When the strut is too long and extends above the guide 18 the upper section of the strut is turned in a counterclockwise direction, and when too short it is turned in the opposite direction. Since the upper end of the strut is visible through the notches 24, accurate adjustment of the strut is greatly facilitated. After the strut has been adjusted the bolt 25 is placed in position to hold the guide 18 and thereby the upper section 14 of the strut against accidental rotation. It will be noted that the lower end portion 30 of the lower strut section 15 is rectangular in form and that this portion extends into the rectangular opening 13 in the member 5 when the strut is seated on the member 12, and since there is only a slight clearance between the member 5 and this rectangular portion of the strut, the strut section cannot rotate. Since, as just described, rotation of either strut section is prevented, accidental adjustment of the strut is positively prevented.

In some cars it may be more advantageous to rotate the upper section 15 of the strut by means of the guide 18 to effect the adjustment of the strut instead of directly as above described. In such cases the wrench or other suitable tool is applied to the rectangular upper end of the guide 18 and as the guide is rotated by means of the wrench, rotary movement is imparted to the upper section 14 and as a result the adjustment of the strut will be effected.

It is well known that when a vehicle is in transit the truck bolster of each truck, due to the necessary clearance between the ends of the bolsters and the supporting side frames, may move a limited distance either longitudinally or transversely of the truck and to prevent such movement from bending the strut 11 or causing a binding action to be set up between the guide 18 and the strut, the lower end of the strut is mounted on the member 5 in such a manner that the strut as a whole may rock freely in either direction with the bolster. When the strut is thus rocked, the lower end thereof will be held by the member 12 against displacement in a direction longitudinally of the truck and by the web of the member 5 against displacement in a direction transversely of the truck. In the present embodiment of the invention the lower end surface of the strut is of rocker shape, as shown in Fig. 1 and is also rounded as shown in Fig. 2.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The combination in a vehicle truck having a support element and a member movable vertically relative to the support element, a mechanism controlling means carried by said support element and having a certain proper control position which is determined according to the position of the movable member with relation to the support element, means for comparing the relative positions of the movable member and the mechanism controlling means, and means for adjusting the position of said mechanism controlling means relative to said movable member.

2. The combination in a vehicle truck having a support element and a member movable vertically relative to the support element, a mechanism controlling means carried by said support element and having a certain proper control position which is determined according to the position of the movable member with relation to the support element, means carried by the movable member for comparing the relative positions of the movable member and the mechanism controlling means, and means for adjusting the position of said mechanism controlling means relative to said movable member.

3. The combination in a vehicle truck having a support element and a member movable vertically relative to the support element, a mechanism controlling strut carried by said support member and extending to the upper side of said movable member, said strut being adjustable to provide the proper control, guide means for said strut carried by said movable member, and removable means cooperating with said movable member and guide means to prevent adjustment of the strut unless said removable means is removed.

4. The combination in a vehicle truck having a support element and a member movable vertically relative to the support element, a mechanism controlling means carried by said support element and having a certain proper control position which is determined according to the position of the movable member with relation to the support element, means for comparing the relative positions of the movable member and the mechanism controlling means, means for adjusting the position of said mechanism controlling means relative to said movable member, and means adapted to cooperate with the vertically movable member and mechanism controlling means to lock the mechanism controlling means in adjusted position.

5. The combination in a vehicle truck having a support element and a member movable vertically relative to the support element, a vertically disposed mechanism control member carried by said supporting element and having a proper control position in which the upper end of the control member is a fixed distance from a fixed portion of the movable member, and means for positioning said control member relative to the movable member.

6. The combination in a vehicle truck having a support element and a member movable vertically relative to the support element, a vertically disposed mechanism control member carried by said supporting element and having a proper control position in which the upper end of the control member is a fixed distance from a fixed portion of the movable member, a guide for said control member carried by said movable member, and tell-tale means embodied in said guide for indicating the proper position for the control member.

7. The combination in a vehicle truck having a support element and a member movable vertically relative to the support element, a vertically disposed mechanism control member carried by said supporting element and having a proper control position in which the upper end of the control member is a fixed distance from a fixed portion of the movable member, a guide for said control member carried by said movable member and having an opening through which said upper end of the control member is adapted to be viewed, and means included in said guide for indicating the proper position for the control member.

8. The combination in a vehicle truck having a support element and a member movable vertically relative to the support element, a vertically disposed mechanism control member carried by said supporting element and having a proper control position in which the upper end of the control member is a fixed distance from a fixed portion of the movable member, a guide for said control member carried by said movable member, and means carried by said guide for indicating the proper position for the control member and having an opening through which the upper end of the control member may be viewed.

9. The combination in a vehicle truck having a support element and a member movable vertically relative to the support element, a vertically disposed mechanism control member carried by said supporting element and having a proper control position in which the upper end of the control member is a fixed distance from a fixed portion of the movable member, said control member comprising a stationary section and a rotatable section, and means operative upon the rotation of said rotatable section for positioning the control member relative to the movable member.

10. The combination in a vehicle truck having a support element and a member movable vertically relative to the support element, a vertically disposed mechanism control member carried by said supporting element and having a proper control position in which the upper end of the control member is a fixed distance from a fixed portion of the movable member, said control member comprising a stationary section and a rotatable section, means operative upon the rotation of said rotatable section for positioning the control member relative to the movable member, and a rotatable guide carried by the movable member and rotatable relative to the movable member to effect the rotation of said rotatable section.

11. The combination in a vehicle truck having a support element and a member movable vertically relative to the support element, a vertically disposed mechanism control member carried by said supporting element and having a proper control position in which the upper end of the control member is a fixed distance from a fixed portion of the movable member, said control member comprising a stationary section and a rotatable section, means operative upon the rotation of said rotatable section for positioning the control member relative to the movable member, a guide for the control member carried by the movable member and rotatable with said rotatable section, and removable means cooperating with said guide and movable member for locking said guide and thereby said rotatable section against rotation.

12. The combination in a vehicle truck having a support element and a member movable vertically relative to the support element, a mechanism controlling member seated on but not secured to said support element and being normally out of engagement with the mechanism to be controlled, and means cooperating with said movable member and control member for urging the control member in close seating contact with the support element.

13. The combination in a vehicle truck having a support element and a member movable vertically relative to the support element, a mechanism controlling member seated on but not secured to said support element, a guide for said control member removably carried by the movable member, and a spring cooperating with said guide and control member for urging the control member into close seating contact with the support element.

14. The combination in a vehicle truck having a support element and a member movable vertically relative to the support element, and a mechanism controlling member rockably carried by but not positively secured to said support element and guided by said movable member, said controlling member being normally out of engagement with the mechanism to be controlled.

15. The combination in a vehicle truck having a support element and a member movable vertically relative to the support element, and a mechanism controlling member carried by said support member and being freely rockable in directions both longitudinally and transversely of the truck, said controlling member being normally out of engagement with the mechanism to be controlled.

16. The combination in a vehicle truck having a support element and a member movable vertically relative to the support element, a mechanism controlling member rockably carried by said support element and guided by said movable member, said controlling member being normally out of engagement with the mechanism to be controlled, and means for urging the strut in seating contact with the movable member.

17. The combination in a vehicle truck having a support element, a truck bolster movable vertically relative to the support element, an empty and load brake controlling strut carried by said support element and guided by said truck bolster, means carried by the truck bolster indicating the proper position for the controlling end of the strut, and means for adjusting the length of the strut relative to the indicating means.

18. The combination in a vehicle truck having a support element, a truck bolster movable vertically relative to the support element, an empty and load brake controlling strut carried by said support element and guided by said truck bolster, means carried by the truck bolster indicating the proper position for the controlling end of the strut, and means for adjusting the length of the strut relative to the indicating means, said means having an opening through which the relative positions of the strut and means are adapted to be compared.

19. The combination in a vehicle truck having a support element and a member movable vertically relative to the support element, a mechanism controlling means carried by said support element and having a certain proper control position which is determined according to the position of the movable member with relation to the support element, means for adjusting the position of said mechanism controlling means to position same in said proper control position, and means for indicating whether or not said controlling means is positioned in its proper control position.

20. The combination in a vehicle truck having a support element and a member movable vertically relative to the support element, a mechanism controlling means carried by said support element and having a certain proper control position which is determined according to the position of the movable member with relation to the support element, means for adjusting the position of said mechanism controlling means to position same in said proper control position, and means carried by the movable member for visibly indicating whether or not said controlling means is positioned in its proper control position.

CLYDE C. FARMER.